(12) United States Patent
McElroy

(10) Patent No.: US 7,912,852 B1
(45) Date of Patent: Mar. 22, 2011

(54) SEARCH-CACHING AND THRESHOLD ALERTING FOR COMMERCE SITES

(75) Inventor: Thomas McElroy, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 321 days.

(21) Appl. No.: 12/114,552

(22) Filed: May 2, 2008

(51) Int. Cl.
*G06F 17/30* (2006.01)
(52) U.S. Cl. .......... 707/769; 707/938; 707/944; 705/26; 705/27; 705/80
(58) Field of Classification Search .................. 707/600, 707/607, 609, 613, 705, 706, 736, 769, 938, 707/944, E17.014, E17.061, 999.003; 705/10, 705/14.4, 26, 27, 28, 80; 455/466
See application file for complete search history.

(56) References Cited

U.S. PATENT DOCUMENTS

2006/0003780 A1 * 1/2006 Mamdani et al. ............. 455/466
* cited by examiner

*Primary Examiner* — Fred I Ehichioya
(74) *Attorney, Agent, or Firm* — Kilpatrick Townsend & Stockton LLP

(57) ABSTRACT

Users can be notified when information becomes available, such as when an item is available for purchase at some point in the future. Users can indicate to receive information about the item using a desired notification type, such as an email message or text message. A notification then can be sent to the user using the indicated type of notification when the item, or information about the item, subsequently becomes available through the system.

26 Claims, 11 Drawing Sheets

SEARCH-CACHING AND THRESHOLD ALERTING FOR COMMERCE SITES

BACKGROUND

In a typical network environment, such as an electronic marketplace, users can search for information using an approach such as specifying several keywords to be used in generating a query to search for related information. In one example, users are able to search for information about a specific item by providing a search engine with information such as the name of the item, manufacturer of the item, and/or characteristics of the item. Most search engines typically organize information and data by relevancy to keywords. In an electronic marketplace, for example, this allows users to locate items offered through the marketplace that then can be purchased or otherwise consumed by a user by selecting one of the available items. Advantages of purchasing from/through an electronic marketplace are numerous. For example, an electronic marketplace can include offers for items from several different merchants, parties, or sources, for example, whereby users (e.g., customers) can compare several offers for an item, where each offer corresponds to a different source, and may include different terms, such as merchant-specific pricing, shipping charges, promotions, conditions, and quality, etc.

However, in such network environments there is no way to return information that is not yet available somewhere across the network. For example, most electronic marketplaces do not provide a way to locate an item that will be available for purchase in the future but is not currently available through the marketplace. While some electronic marketplaces might offer pre-orders for certain items, this still requires a certain amount of knowledge and information about an item, and requires that the information be entered into the system providing the marketplace. In order to locate items that are not available through the marketplace, users may have to periodically conduct a search for the items. This is very tedious and time consuming. Further, information about such unavailable items is not generally stored by the electronic marketplace until the items are introduced in commerce or become available within the electronic marketplace. In such a case, the electronic marketplace is not able to recommend other items that users may be interested in as an alternative purchasing option since there is no information available for comparison to identify such items.

BRIEF DESCRIPTION OF THE DRAWINGS

The foregoing aspects and many of the attendant advantages of various embodiments will become more readily appreciated as the same become better understood by reference to the following detailed description, when taken in conjunction with the accompanying drawings, wherein.

DETAILED DESCRIPTION

Figure 1:
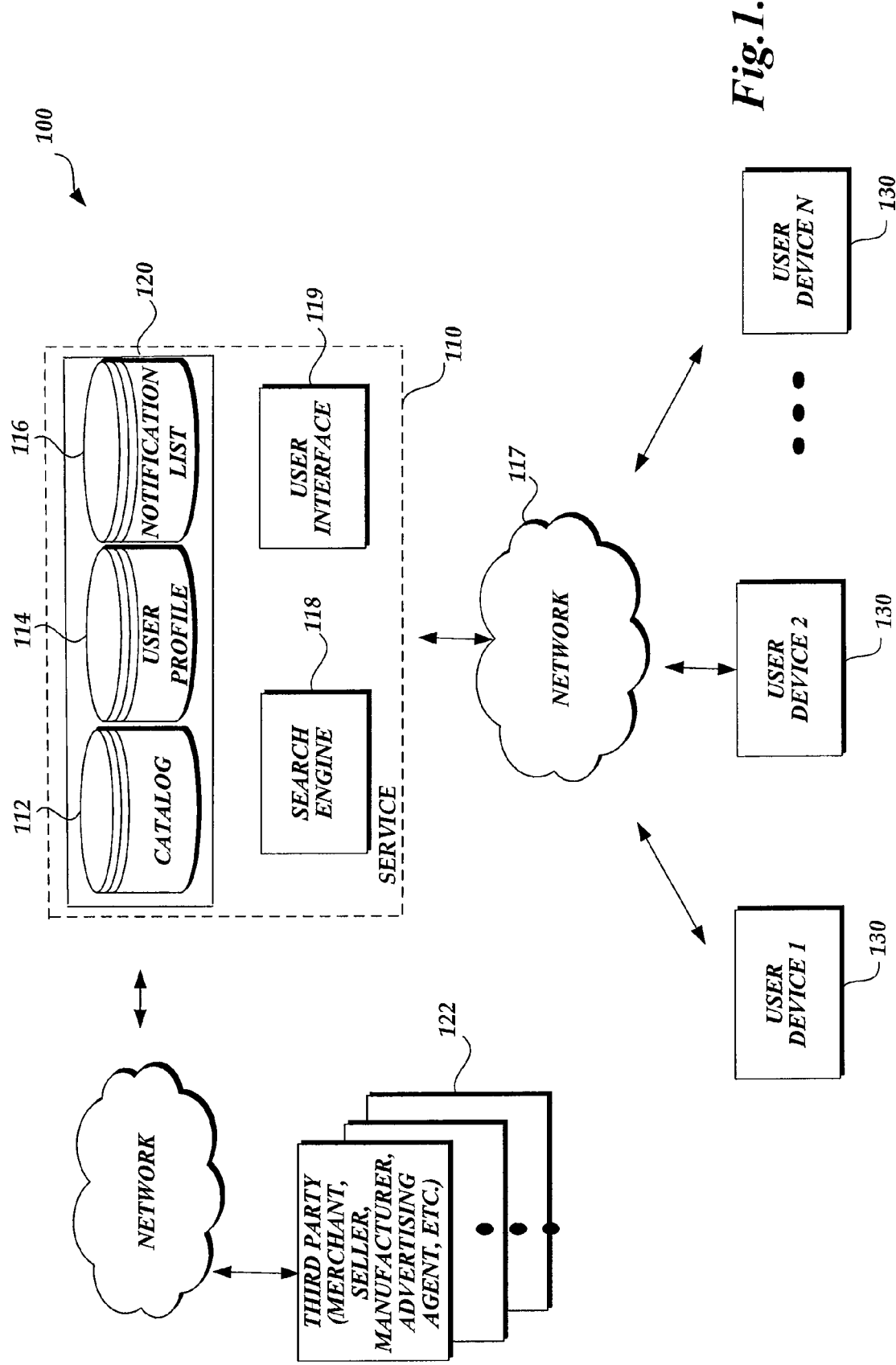
FIG. 1 is a pictorial diagram showing an exemplary computing environment in which embodiments may be implemented.

Systems and methods in accordance with various embodiments of the present disclosure may overcome one or more the aforementioned and other deficiencies experienced in conventional approaches to providing information for items in an electronic and/or networked environment where those items will be available at some point in the future. As used herein, the term "item" refers to anything that can be ordered, purchased, rented, used, or otherwise consumed and/or accessed via a network request or electronic submission, such as a product, service, or system that can be located or searched over catalog meta data information of items stored for various electronic market places. In certain embodiments, a user is able to request or otherwise indicate whether that user would like to be alerted, notified, or receive information about a particular item when that item becomes available for consumption (e.g., purchase, rent, or lease) in the future, although the item is not currently purchasable in an electronic marketplace or network-based purchasing system. While an electronic marketplace is used for purposes of explanation, it should be understood that this is merely an example and that any electronic environment where a user or other entity is able to view or otherwise receive or access multiple instances or objects of content that might be available at some future point in time can benefit from, and be used with, various embodiments described herein. Basic aspects of an electronic marketplace, which typically allows first and/or third party merchants, providers, or sources to provide items for consumption via electronic transactions, are well known in the art and will not be discussed herein in detail. Aspects of a marketplace also can be provided as one or more services to various users or providers.

In one embodiment, product information about an item is searched in an appropriate data store at a predetermined time, or via a triggering event, until the item is located. Certain embodiments also assist users in identifying an item if those users do not have enough information for a successful search query, such as an item name, manufacturer, item identification number, etc., through interaction with users.

In certain embodiments, when a user is looking for a particular item that is unavailable for purchase in an electronic marketplace or merchant site, the user is able to register to receive a notification when such item is available for consumption in the marketplace. For example, a user submits a search query to the service system in order to locate a particular item. If the particular item is not purchasable through the system, the product information of the particular item may not yet be stored in the data store where the system obtains search results for the search query. As a result, the search query may return search results where information about the particular item can not be found. The system may inform the user about the unavailability or suggest other items that can be comparable to the particular item. In some cases, the system may collect more information, such as more specific search criteria, etc., from the user to narrow the scope of the search or to obtain a new search keyword. The user may want to wait until the particular item is available for the purchase.

The electronic marketplace receives a registration from the user to get a future notification on the results of the search. The notification will be sent out after the marketplace detects that items have become available or items will become available in the near future that match the search. The registration and the search query for the particular item may be stored in a data store for future notification. There are many ways to detect the availability of the particular item. One way may be to periodically re-run the stored search query on the catalog information data store to see if the item becomes available. Upon detecting the availability of the item, the system sends the user a notification that informs the user that the item becomes available for purchase.

The following detailed description describes various exemplary embodiments. Although specific system configurations, screen displays, and flow diagrams are illustrated, it should be understood that the examples provided are not exhaustive and are not intended to limit the scope or variations of the various embodiments to the precise forms and examples disclosed. Persons skilled in the field of processing purchase transactions will recognize components and process steps described herein that may be interchangeable with other components or steps, or combinations of components or steps, and still achieve benefits and advantages of the various embodiments. It should also be understood that the following description is presented largely in terms of logic operations that may be performed by conventional computer components. These computer components, which may be grouped at a single location or distributed over a wide area on a plurality of devices, generally include computer processors, memory storage devices, display devices, input devices, etc. In circumstances where the computer components are distributed, the computer components are accessible to each other via communication links.

In the following description, numerous specific details are set forth in order to provide a thorough understanding of various embodiments. However, it will be apparent to one skilled in the art that other embodiments may only contain some or may contain none of these specific details. In other instances, well-known process steps have not been described in detail in order not to unnecessarily obscure the disclosure.

FIG. 1 illustrates a networked environment 100 suitable for allowing users to register with an electronic marketplace 110 to get a notification on an item when the item becomes available for purchase. Items may not be available for purchase for various reasons. For example, an item may be back ordered, sold out, not manufactured, or not released. Users can submit a request for a future notification on an unavailable item. A request can include any appropriate request sent over an appropriate system or network, such as a request submitted to a Web page over the Internet or a message sent via a messaging system to a content provider, for example. As will be discussed in detail below, users may specify certain conditions for receiving a notification. For example, users may want to receive a notification if a particular item is available for purchase only before a certain date, for example Christmas or someone's birthday. Additionally, the networked environment 100 may facilitate a purchase transaction for items by users. The networked environment 100 of FIG. 1 includes one or more user devices, such as user devices 130, by which a user (not shown) can interact with the electronic marketplace 110. The user devices 130 communicate via a communication network, such as the Internet 117, with the electronic marketplace 110.

The user devices 130 are typically computing devices including a variety of configurations or forms such as, but not limited to, laptop or tablet computers, personal computers, personal digital assistants (PDAs), hybrid PDA/mobile phones, mobile phones, workstations, and the like. While illustrative embodiments have been illustrated and described, it will be appreciated that various changes can be made therein without departing from the spirit and scope of the description.

The user devices 130 are connected to the electronic marketplace 110 via a communication network, such as the Internet 108. As illustrated in FIG. 1, the electronic marketplace 110 may comprise one or multiple servers or discrete components to conduct a search, manage user requests, facilitate a purchase transaction for items, and campaign advertisement. As illustrated in FIG. 1, the electronic marketplace 110 may be connected to third party systems 122 where new item information, PR information, or news releases on a new item can be provided via a communication network. The electronic marketplace 110 may update item information in catalog detail data 112, based on the new information provided from the third party. The third party may include a merchant, manufacturer, advertisement agent, seller, etc.

The electronic marketplace 110 provides users a way to locate an item through interaction with a search engine 118. The electronic marketplace 110 may provide information related to an item, including detail information, promotions, merchant information, price information, attributes, item identification number, etc. The information related to items such as catalog detail data 112 may be stored in a data store(s) connected to the electronic marketplace 110. As used herein the term "data store" refers to any device or combination of devices capable of storing, accessing, and retrieving data, which may include any combination and number of data servers, databases, data storage devices, and data storage media, in any standard, distributed, or clustered environment. User profile information such as user information data 114, including, but not limited to, user account information, purchase history, wish list, buddy list, or preference may be maintained and stored in the data store 120. The aggregated search history information may be maintained and stored in the user information data 114. The electronic marketplace 110 also maintains a list of notification requests such as a notification list data 116 in the data store 120. The list of notification requests may include a series of user requests for receiving a notification on a searched item that was not available for purchase at the time of search. The list of notification requests may include a series of search queries that could not return good search results which likely include information about a searched item. The notification is sent out after the electronic marketplace 110 detects that the searched item becomes available for purchase by conducting a search based on each search query stored in the list of notification requests.

It should be understood that there can be many other aspects that may need to be stored in the data store(s), such as for page image information and access right information, which can be stored in any of the above listed mechanisms as appropriate or in additional mechanisms in the data store 120. The data store 120 is operable, through logic associated therewith, to receive instructions from the network purchasing service system, and obtain, update, or otherwise process data in response thereto. In one example, a user might submit a search request for a certain type of item. In this case, the catalog detail data 112 in the data store 120 may be queried and information about items of that type may be returned to the user, such as in results listing on a Web page that the user is able to view via a browser on the user device 130. Information for a particular item of interest can be viewed in a dedicated page or window of the browser.

Figure 2:
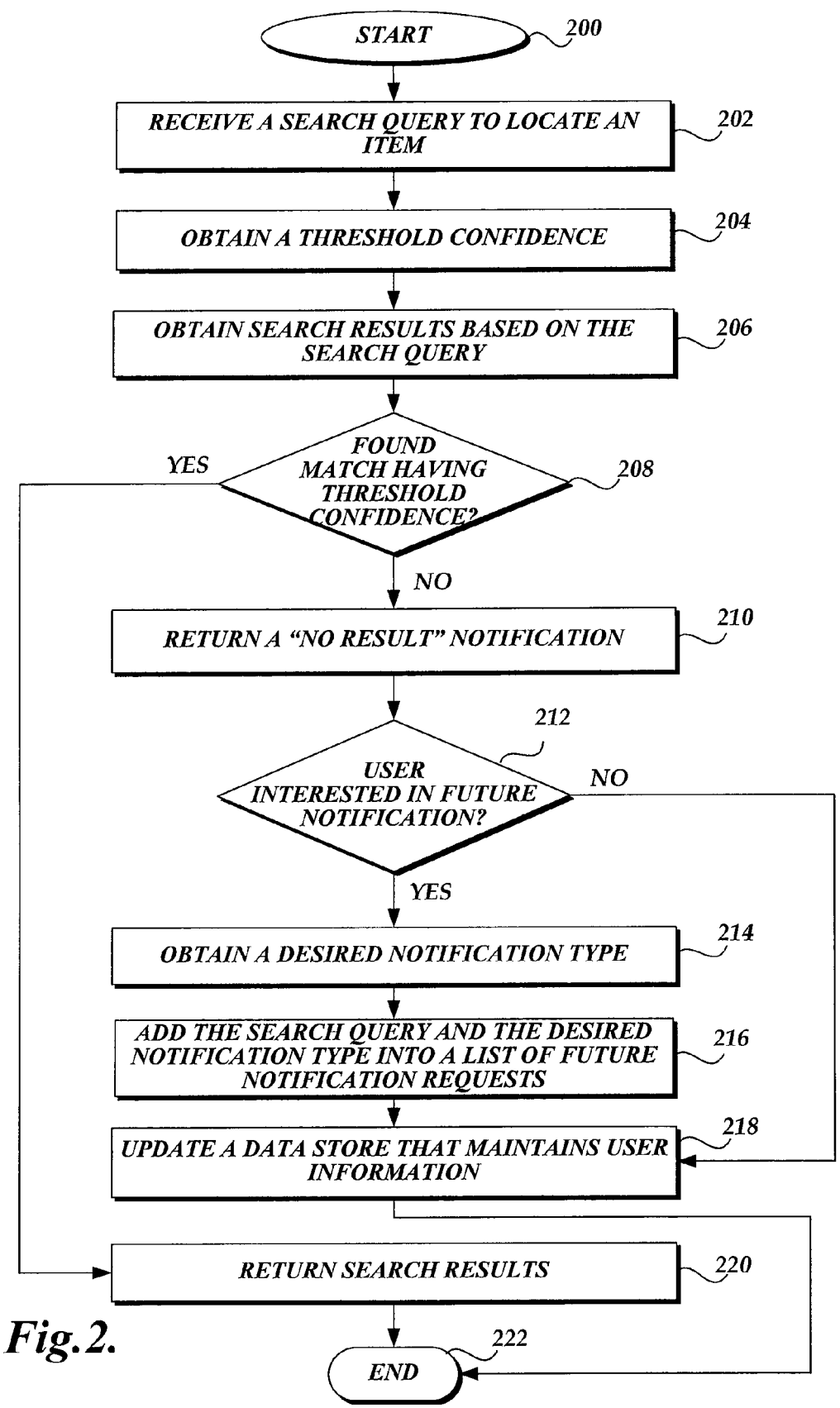
FIG. 2 is a flow diagram of an item search routine in accordance with one embodiment.
Figure 6A:
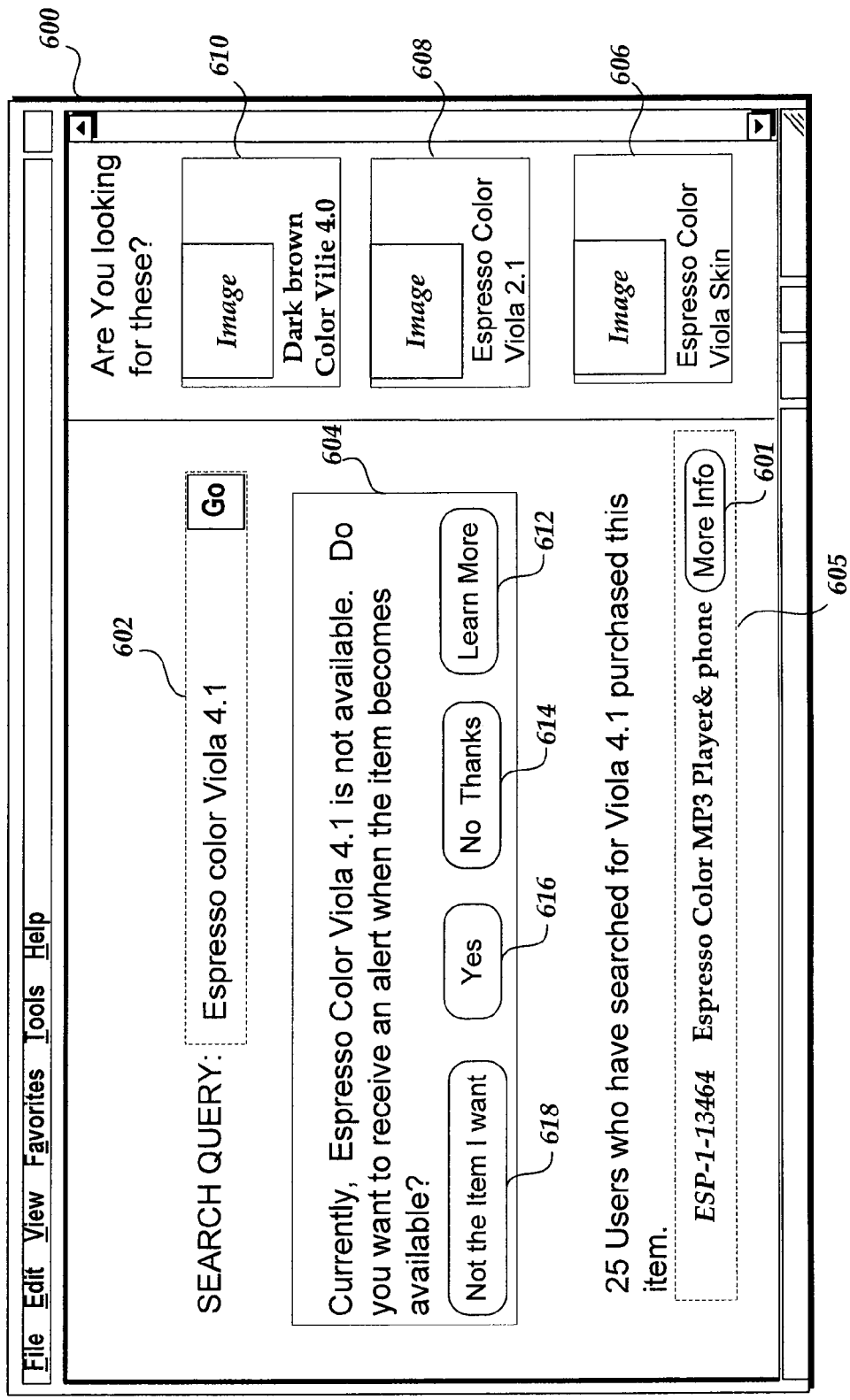
FIGS. 6A-6F are exemplary screen displays generated while a user interacts with the service system for obtaining information about an item that is not presently available for sale in accordance with one embodiment.

FIG. 2 is a flow diagram of an example item search routine that can be used in accordance with one embodiment. Beginning with block 202, a system providing an electronic marketplace (hereinafter, system) 110 receives a search query from a user to locate an item. Referring now to FIG. 6A, an example screen display 600 while a user interacts with the search engine 118 in the system 110 is depicted. In some embodiments, a user inputs a search query 602 that includes search criteria (keywords) for locating an item. For example, a user inputs "Espresso color Violar 4.1" as a search query to locate a cell phone name "Violar 4.1" in "Espresso color." In some instances, a user does not have enough information for a successful search query, such as an item name, manufacturer, item identification number, etc.

Figure 6B:
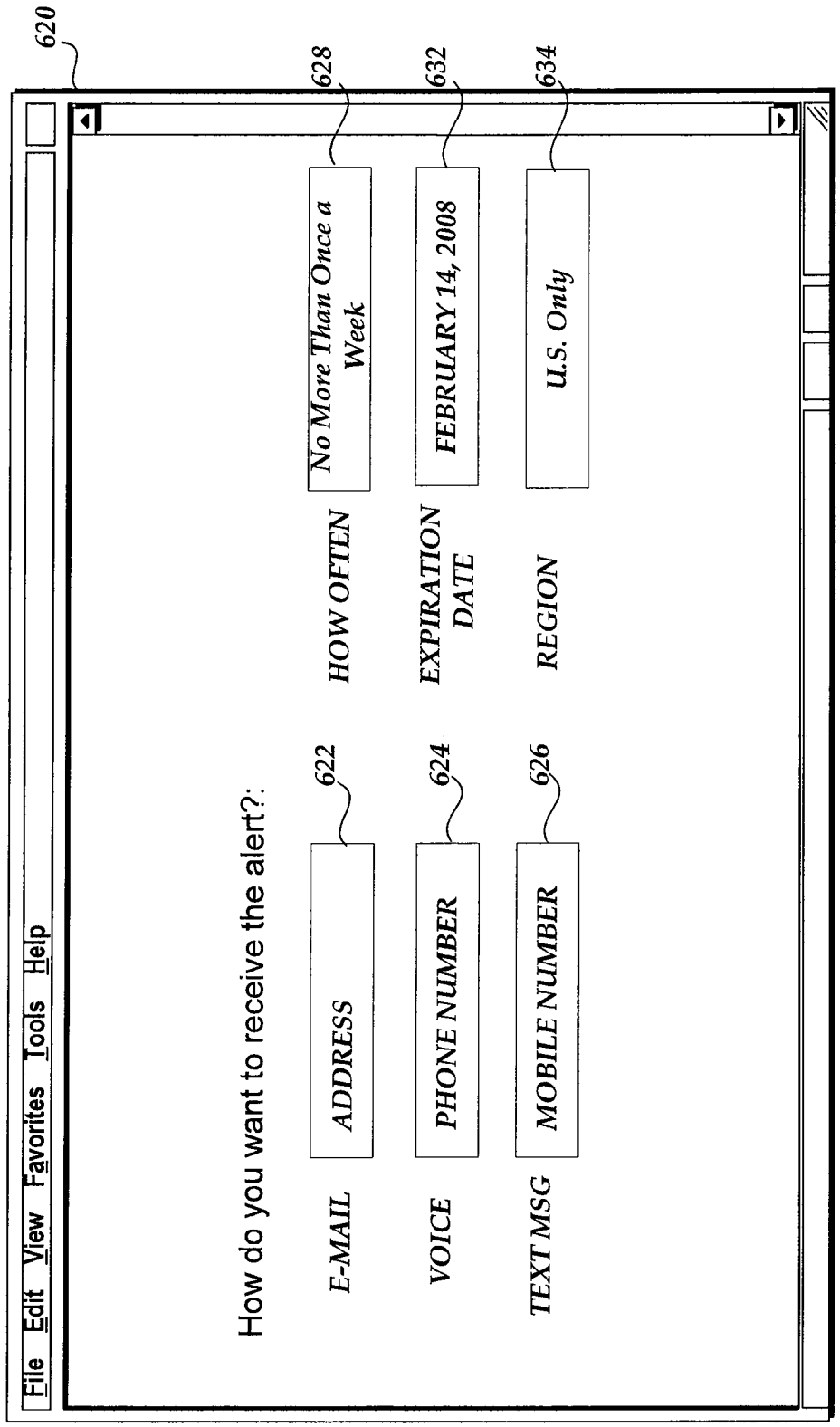

For example, a user may not know the product name but may wish to have information about a device with which the user can read, play songs and use as a cell phone. Referring now to FIG. 6F, an example screen display 680 while a user interacts with the search engine 118 in the system 110 is depicted. A user inputs a search query 684 that includes search criteria (keywords) for locating information about an item. For example, a user inputs "Wireless Book reading, MP3 player, and Phone" to locate information about a device with which the user can read, play songs and use as a cell phone.

Referring back to FIG. 2, at block 204, the system 110 obtains a "threshold confidence" (relevancy confidence) value for the search results. A "threshold confidence," as used herein, refers to a threshold corresponding to a level of confidence about the search results. If the system 110 obtains one or more search results with at least the threshold confidence, the system 110 may conclude that the searched item can be found within the search results and return those search results that meet or exceed the threshold confidence to the user device. The system 110 may have a default threshold confidence and/or a user defined threshold confidence. Most search engines utilize a relevancy or relevancy score that may be determined based on information about an item, such as keywords, attributes, or characteristics of the item, generally provided by a manufacturer or provider of the item. In one embodiment, relevance scores of the search results may be evaluated and compared with the threshold confidence to filter search results that are less relevant to the search query. Generally, the relevancy score is evaluated based on a degree of relevancy to the search query. In such an embodiment, only search results having at least the threshold confidence (i.e., having relevancy scores that meet or exceed the obtained threshold confidence) may be presented to the user. It is noted that the relevancy score is described herein only for the sake of discussion. Any type of values that can measure the likelihood of locating an item in a search result may be used in conjunction with the threshold confidence.

At block 206, the search engine 118 of the system 110 conducts a search based on the search query and obtains search results. In some embodiments, the search keyword index may be used by the search engine to obtain search results that are both relevant to a user's search query and likely to include information about the searched item. At decision block 208, a determination is made as to whether any of the search results match the search query with the threshold confidence. In one embodiment, a determination is made as to whether any of the search results have a relevancy score that meet or exceed the obtained threshold confidence. If it is determined that some of the search results match the search query with the threshold confidence, the search results matching the search query with the threshold confidence will be returned to the user device at block 220. The search results may be sorted and listed in order of relevancy scores. The user device presents the received search results to the user.

Figure 6C:
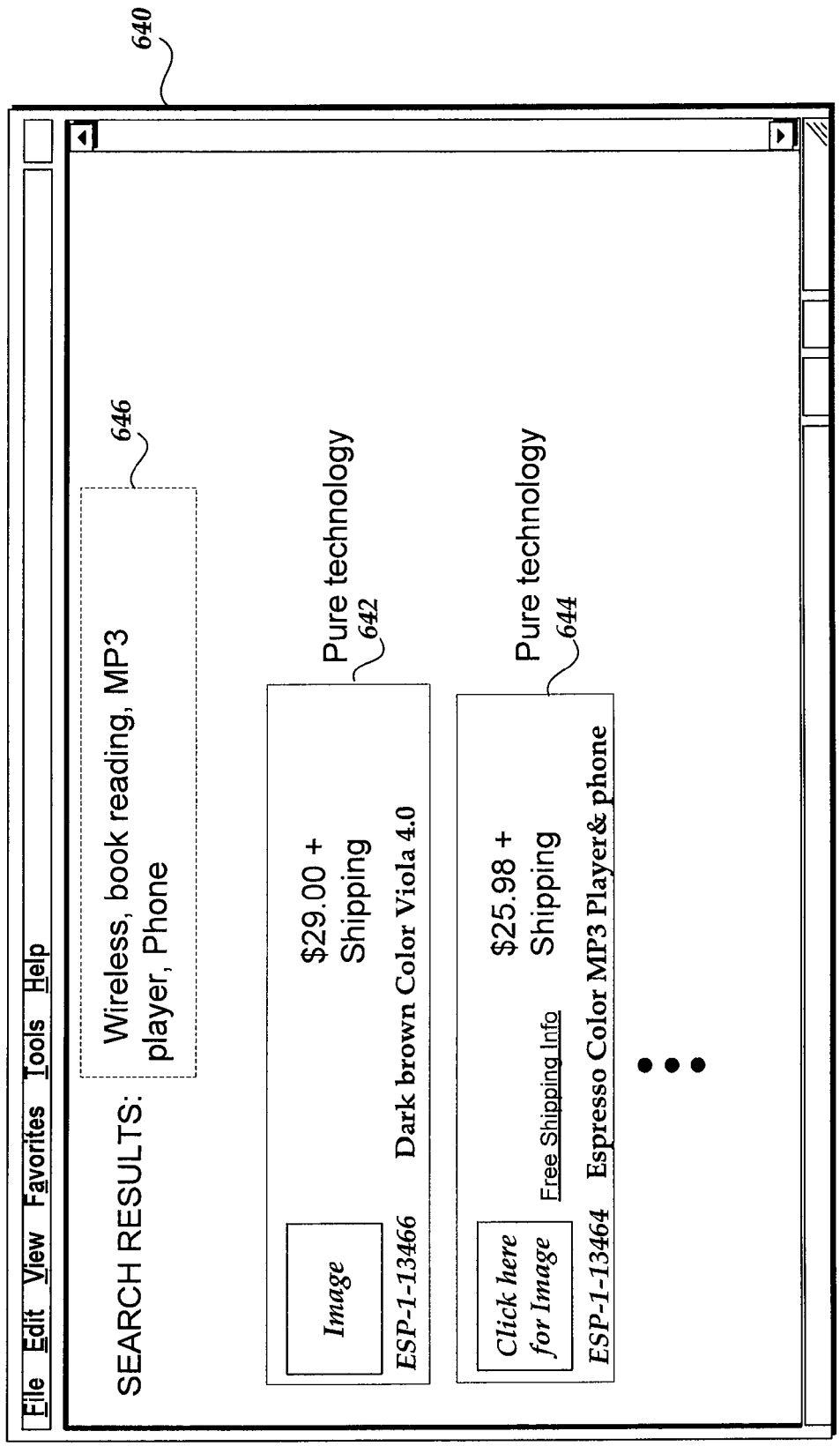

Referring to FIG. 6C, after the user inputted a search query, for example, "Wireless book reading, MP3 player, and phone" 646, a list of search result items such as 642"brown color Violar 4.0" 642, "Espresso Color MP3 Player and Phone" 644, etc. may be presented to the user. In FIG. 6C, the user can select an item from the list 642, 644 in order to purchase the item. If it is determined that none of the search results match the search query with the threshold confidence, the system 110 return a "No Result" notification to the user at block 210. Referring back to FIG. 6A, a sub-window 604 including a "No Result" notification is depicted. As shown, the user is notified that the item "Espresso color Violar 4.1" is not available for purchase. The user may be given several menu options, such as a menu option "Yes" 616 to register a request for a future notification on the item, a menu option "Not the item I want" 618 to start a new search, a menu option "No Thanks" 614, a menu option "Learn More"612 to view a detail page where the user can have detailed information about the future notification.

Figure 6D:
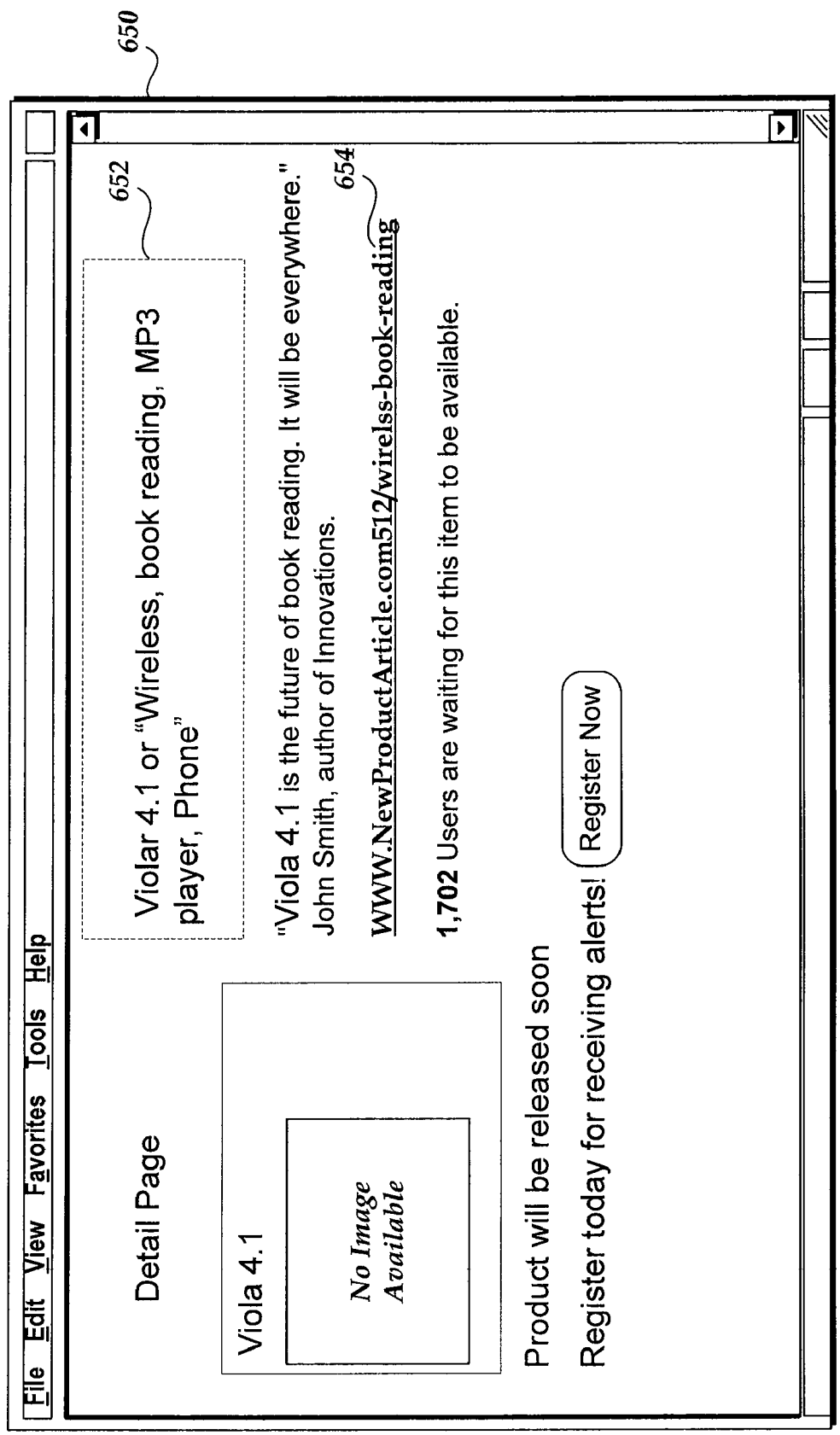
Figure 6E:
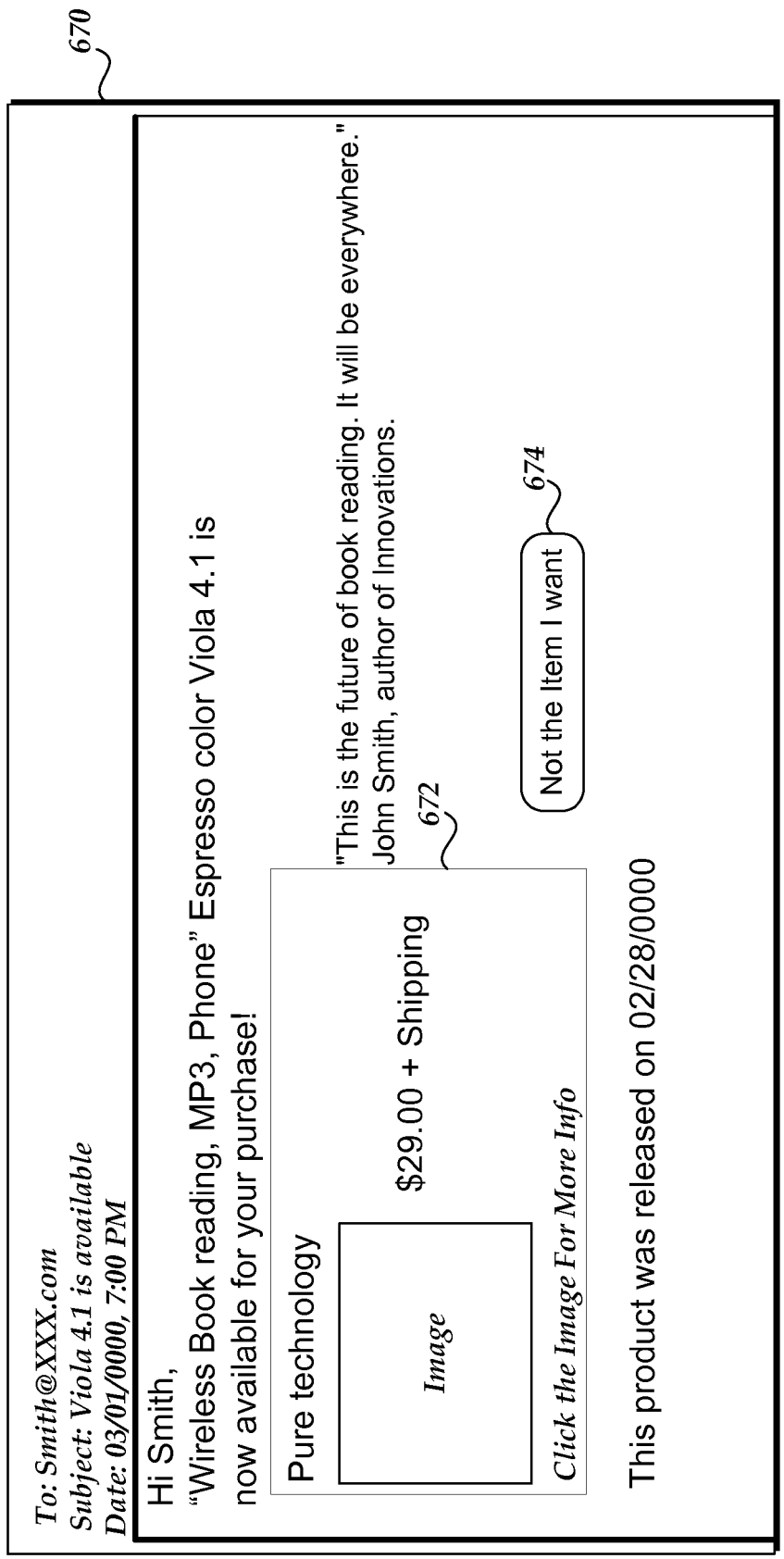
Figure 6F:
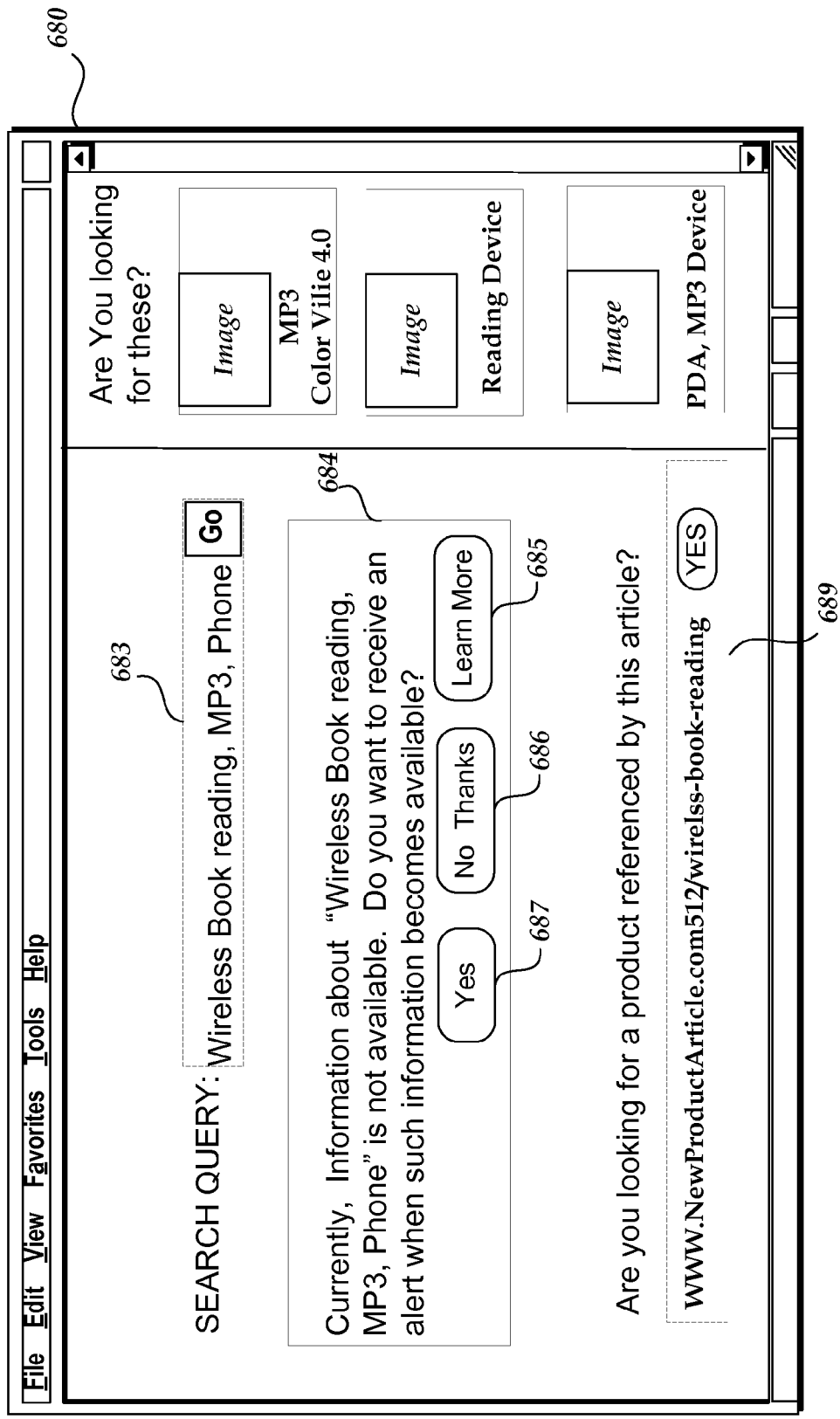

Likewise, as shown in FIG. 6F, a sub-window 684 including another "No Result" notification is depicted. As shown, the user is notified that information for items is not available to be accessed in the system for given search keywords, "Wireless Book reading, MP3, and Phone" 683. As with FIG. 6A, the user may be presented several menu options, such as a menu option "Yes" 687 to register a request for a future notification on information when it is available, a menu option "No Thanks" 686, a menu option "Learn More" 685 to view a detail page where the user can have detailed information about the future notification. Referring now to FIG. 6D, a detail page 650 where the user can register for receiving a future notification is depicted. As shown, the search query "Violar 4.1 or Wireless, Book reading, MP3 player and Phone" 652 is presented to the user. As will be described below, the system may also present other available information 654 about the item such as articles, advertisement, image, product information, etc. obtained from third party sources.

Once the user submits a request for the future notification, the future notification may be generated and transmitted to the user as the item becomes available for purchase or the information for the item becomes available to be accessed in the network purchasing system 110.

In alternative embodiment, if it is determined that none of the search results match the search query with the threshold confidence, the system 110 may collect more information from the user to narrow the scope of the search or to obtain a new keyword that will result in more relevant search results. For example, the system 110 may ask the user about a category of the item, manufacturer of the item, price range, color, size, promotion availability, etc. After collecting more information from the user, the system 110 may build a new search query based on the user-inputted search query and the collected data. In some cases, there may be two or more conflicting or competing keywords that are identified from the additional information and the initial search query. As will be well appreciated, there are many ways to determine the most relevant keywords. For example, the user interface may present images of two or three items to choose from, each of which is pertinent to a particular competing keyword. For example, the system 110 may identify "a duffle bag," and "a suitcase," as competing keywords. The system 110 may ask the user whether the searched item is more related to "a duffle bag," or "a suitcase." The user may choose one image which the user thinks more relevant to the searched item. The keyword related to the selected image may be used as part of the search query. As such, the search engine can use that user interaction information to build a new search query. Subsequently, the search engine may conduct another search based on the new search query and filter the search results using the relevancy score to the newly built search query. In another alternative embodiment, the system 110 may use search history of other users to identify a set of search keywords with which the search engine can obtain better search results. In one embodiment, the system 110 may query a third party's data store to obtain information about images, items, and/or keywords that are relevant to the search query. The system 110 may present the user with the information obtained from the third party in order to refine the search criteria or to assist the user to identify an item. The user can validate or invalidate whether the information is something relevant to what the user is looking for. In some embodiments, the user can validate or invalidate whether the information is about the item that the user is looking for. Once the user validates, the information may be used as part of the search query. Referring to FIG. 6F, the user is asked to validate whether a product referenced by an article 689 is the item the user is looking for. Other available information such as articles, advertisement, image, product information, etc. obtained from third party sources may be used to assist the user to identify an item.

At decision block 212, a determination is made as to whether the user is interested in receiving a future notification on the searched item. If it is determined that the user is interested, the system 110 may receive a desired notification type from the user at block 214. In some embodiments, the user can specify a desired notification type, including an email notification, text notification, voice notification, a chatting notification, or a pop-up window notification, etc., as well as other criteria of a notification. Referring now to FIG. 6B, an example screen display while the user specifies one or more desired notification types is depicted. In some embodiments, the user may be presented with a predefined list of notification types, for example, an email notification 622, voice notification 624, text message notification 626, etc. (as shown in FIG. 6B) that is used to receive further information on the searched item. As will be well understood, the user can use one or more email addresses for an email notification, one or more telephone numbers for voice or text notification. Additional information, such as a frequency of the notification 628 or an expiration date 632 of the notification may be obtained from the user. The user can specify the preferred region 634 where the item is available or released, for example "U.S. only," "Anywhere," "E.U. only," "U.S. and Canada," etc. The system 110 may continue communicating with the user to obtain more information on a desired notification type and desired conditions of the notification.

At block 216, the system 110 adds the search query and the notification type into a list of notification requests (a notification list). At block 218, the system 110 updates the data store 120 that maintain user information such as user profile information. The system 110 may update the desired notification type for a notification if there is a change and update history of the user activities based on the user interactions during the search service. The system 110 may update the user information to reflect the fact that the user is not interested in receiving a future notification on the item as illustrated at blocks 212 and 218. In one embodiment, the user may specify a different notification type for a different item. For example, the user may want to receive an email notification for a game console, a phone call for a notification for a brand new computer, and a text message for a cruise package. In another embodiment, the system 110 may not ask a desired notification type if the user has set a default notification type in the user profile information. Referring back to FIG. 2, after returning the search results (block 220) or updating the data store 120 that maintains user profile information (block 218), the routine completes at block 222.

Figure 3:
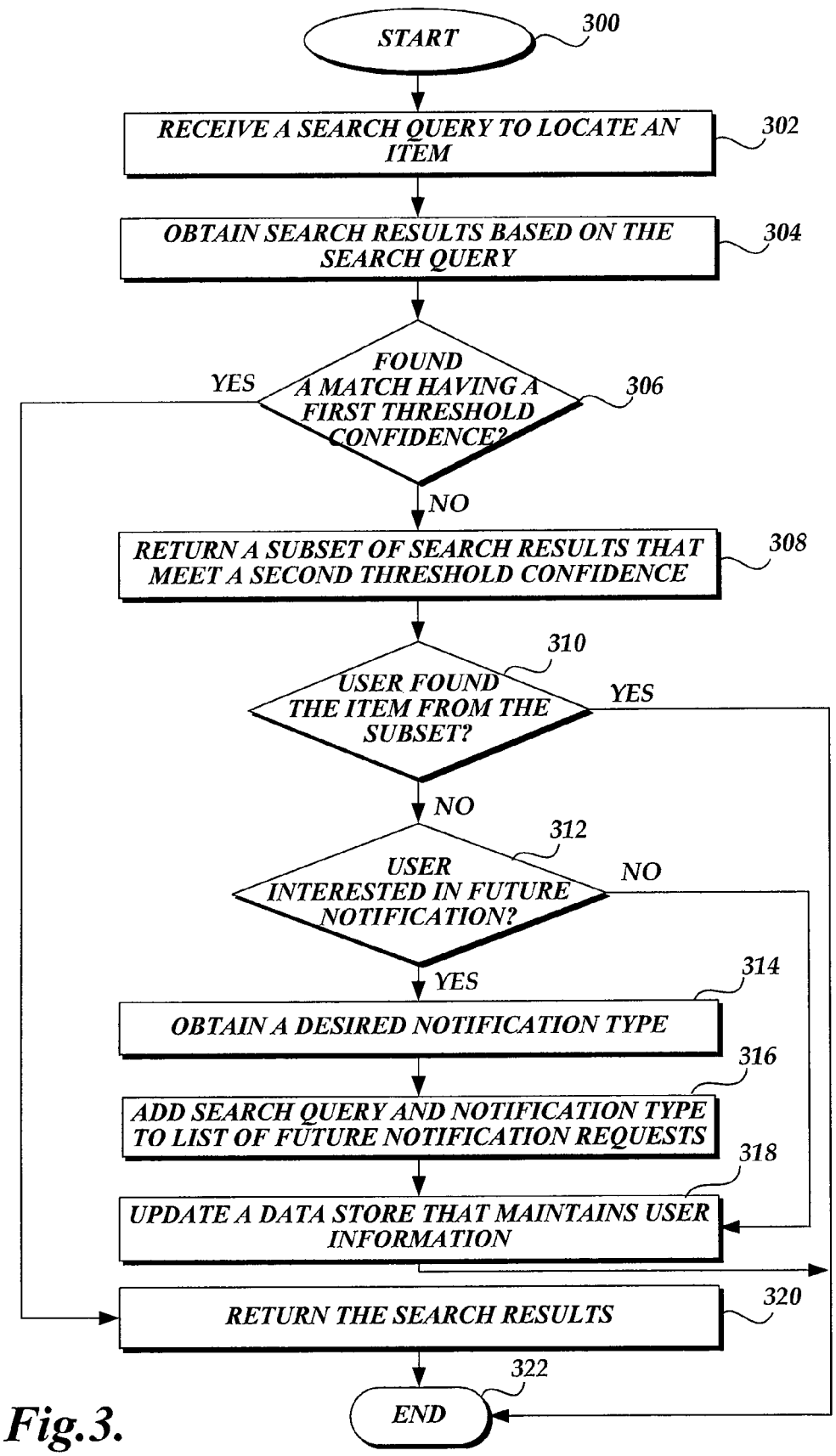
FIG. 3 is a flow diagram of another item search routine in accordance with one embodiment.

FIG. 3 is a flow diagram of another item search routine in accordance with one embodiment. Beginning with block 302, the system 110 receives a search query from a user to locate an item. At block 304, the search engine 118 conducts a search based on the search query and obtains search results. As with FIG. 2, the system 110 may have a threshold confidence and/or a user defined threshold confidence to determine a set of search results that likely include information about the searched item. In some embodiments, the system 110 maintains several levels of threshold confidence depending on a category of an item, user profile, etc. At decision block 306, a determination is made as to whether any search result matches the search query with a first threshold confidence. The search results with the first threshold confidence are considered to include information about the searched item. If it is determined that some of the search results match the search query with the first threshold confidence, the search results matching the search query with the first threshold confidence will be returned and presented to the user as illustrated at block 320. If it is determined that none of the search results match the search query with the first threshold confidence, the system 110 returns a subset of search results that match the search query with the second threshold confidence at block 308. The second threshold confidence may be used to obtain a larger set of search results where the user can locate the searched item or substitute items. For example, a first threshold confidence is set to 85% of relevancy and a second threshold confidence may be set to 65% of relevancy. This may be helpful in instances where a user does not know for sure exactly what item the user is looking for. The system 110 may interact with the user to collect more information to narrow the scope of the search or to obtain a new keyword that will result in more relevant search results.

Referring back to FIG. 6A, a screen display 600 presents a list of search results that match a search query 602, for example "Espresso color Voila 4.1" with a second threshold confidence. In some instances, although the user inputs a search query "Espresso color Voila 4.1," the user is in fact searching for other similar items, such as "MP3 Player and Phone," etc. that have the known attributes and aspects of the searched item. As shown, a list of other comparable items such as "Dark Brown Color Vilie 4.0" 610, "Viola 2.1" 608, "Espresso Viola Skin" 606 608 may be presented to the user. In FIG. 6A, the user can select an item from the list 610, 608, 606 in order to purchase the item.

At decision block 310, a determination is made as to whether the user finds an item to purchase or to obtain product information about the searched item from the subset. If it is determined that the user does not find an item to purchase from the returned search results, a determination is made at decision block 312 as to whether the user is interested in receiving a future notification on the searched item.

If it is determined at decision block 312 that the user is interested in a future notification, the system 110 may allow the user to specify a desired notification type or method at block 314. In some embodiments, the user may be presented with predefined notification types, for example, an email notification 622, a voice notification 624, a text message notification 626, etc. that is used to receive further information on the searched item as shown in FIG. 6B. As will be well understood, the user can use one or more email addresses, and telephone numbers. Other information, such as a frequency of receiving the notification, expiration of the notification may be obtained from the user. The user can specify other preferred conditions for the notification. For example, the user may request to transmit a notification to other users included in his/her buddy list. The user can designate a group of users to get a notification for a particular item. The user can request to block any notifications that are not registered by the user.

At block 316, the system 110 may add the registration request into a list of future notification requests. Each request for a future notification may include a search query, a notification type, user information, etc. Some requests may include a specific item name as a search query (search keywords) if the name or brand is already known and identified/confirmed by the user. As will be described in greater detail below, upon detecting a triggering event, the network purchase system 110 may work through the list of future notification requests and conduct a search based on a search query included in each request in order to check whether a searched item becomes available for purchase within the system 110.

At block 318, the system 110 updates the data store 120 that maintains user information. The system 110 may update the user profile information to reflect the fact that the user wanted to receive a notification though the desired notification type. The system 110 may update history of the user based on the user interactions with the system 110. The system 110 may update the user information to reflect the fact that the user is not interested in receiving a future notification on the item as illustrated at blocks 312 and 318.

In one embodiment, the user may specify a different notification type for a different item. In another embodiment, the system 110 may use a desired notification type stored in the user profile information as a default notification type unless the user specifies a different notification type. After returning the search results (block 320) or updating the data store 120 that maintains user profile information (block 318), the routine completes at block 322.

Figure 4:
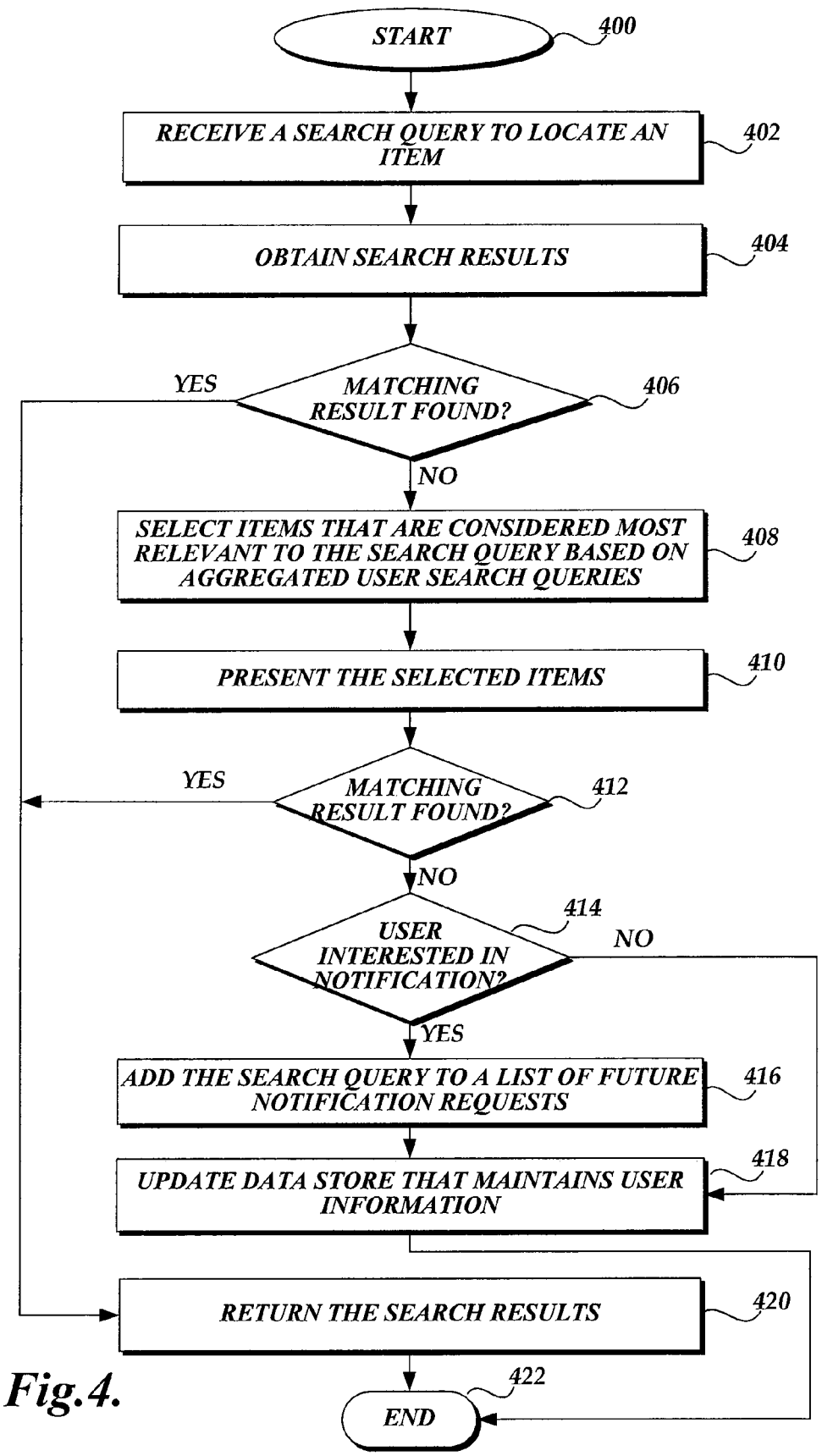
FIG. 4 is a flow diagram of yet another item search subroutine in accordance with one embodiment.

FIG. 4 is a flow diagram of another item search routine in accordance with one embodiment. As with FIGS. 2 and 3, a user may have an account with the system 110 where the user profile information is stored. The user profile information includes, but is not limited to, a login name, password, preference, threshold confidence level, billing address, shipping address, purchase history, buddy list, wish list, etc. Beginning with block 402, the system 110 receives a search query from a user to locate an item. At block 404, the system 110 (the search engine) conducts a search based on the search query and obtains search results. As with the flow diagrams depicted in FIGS. 2 and 3, the system 110 may have a threshold confidence and/or a user defined threshold confidence to determine a set of search results that likely include information about the searched item. In some embodiments, the system 110 maintains several levels of threshold confidence depending on a category of an item, user profile, etc. At decision block 406, a determination is made as to whether any of the search results match the search query with a first threshold confidence. In some embodiments, the system 110 determines whether there are some search results that have a relevancy score that meets or exceeds the threshold confidence. If there are any, it is considered that a matching search result is found for the search query and the matching search result may be presented to the user.

If it is determined at decision block 406 that some search results match the search query with the threshold confidence, the matching search results will be returned and presented to the user as illustrated at block 420. If it is determined at decision block 406 that none of the search results match the search query with the first threshold confidence, the system 110 selects (identifies) items that are considered most relevant to the search query based on other users' search history at block 408. For example, the system 110 may use the search history of other users to identify search keywords with which the search engine can get better search results. At block 410, the system 110 presents information about the selected items on the user device. The user can purchase one of the presented items through several interactions with the system 110.

Referring now to FIG. 6A, a screen display 600 displays the items selected based on the aggregated search information collected from other users, which the user might be interested in. For the sake of discussion, assume that a user inputs a search query "Espresso color Violar 4.1" to get information about a cell phone name "Violar 4.1" in dark brown. After search over the catalog detail data, the system cannot find information about the particular item and the user is notified that the item "Espresso color Violar 4.1" is not available for purchase, as depicted in a sub window 604. In addition, the user may be given information about "Espresso Color MP3 Player & Phone" 605 since many other users who searched "Violar 4.1" have purchased "Espresso Color MP3 Player & Phone."

Referring back to FIG. 4, at decision block 412, a determination is made as to whether the user finds a search result item for purchase. As mentioned above, users may want to have information about available items that have similar characteristics and attributes of the searched item. In such a case, the user may decide to buy one of the selected items instead. If it is determined at decision block 412 that the user does not find an item for purchase, at decision block 414, another determination is made as to whether the user is interested in receiving a future notification on the searched item when the searched item becomes available for purchase.

If it is determined at decision block 414 that the user is interested in receiving a future notification, the system 110 may allow the user to register a request for a notification with a desired notification type at block 416. Upon receipt of the request, the system 110 may add the request along with the search query and the desired notification type into a list of future notification requests on the item as illustrated at block 416. The list of future notification requests may be stored in the data store 120 of the system 110. At block 418, the network purchase system 110 updates the data store 120 that maintains user information. The system 110 may update the user profile information to reflect the fact that the user wanted to receive a notification though the desired notification type or the user's decision to purchase a substitute item. Additionally, the system 110 may update the history information of the user based on the user's interactions with the system 110. The system 110 also updates the user information to reflect the fact that the user is not interested in receiving a future notification on the item as illustrated at blocks 412 and 416. After returning the search results (block 420) or updating the data store 120 that maintains user profile information (block 418), the routine completes at block 422.

Figure 5:
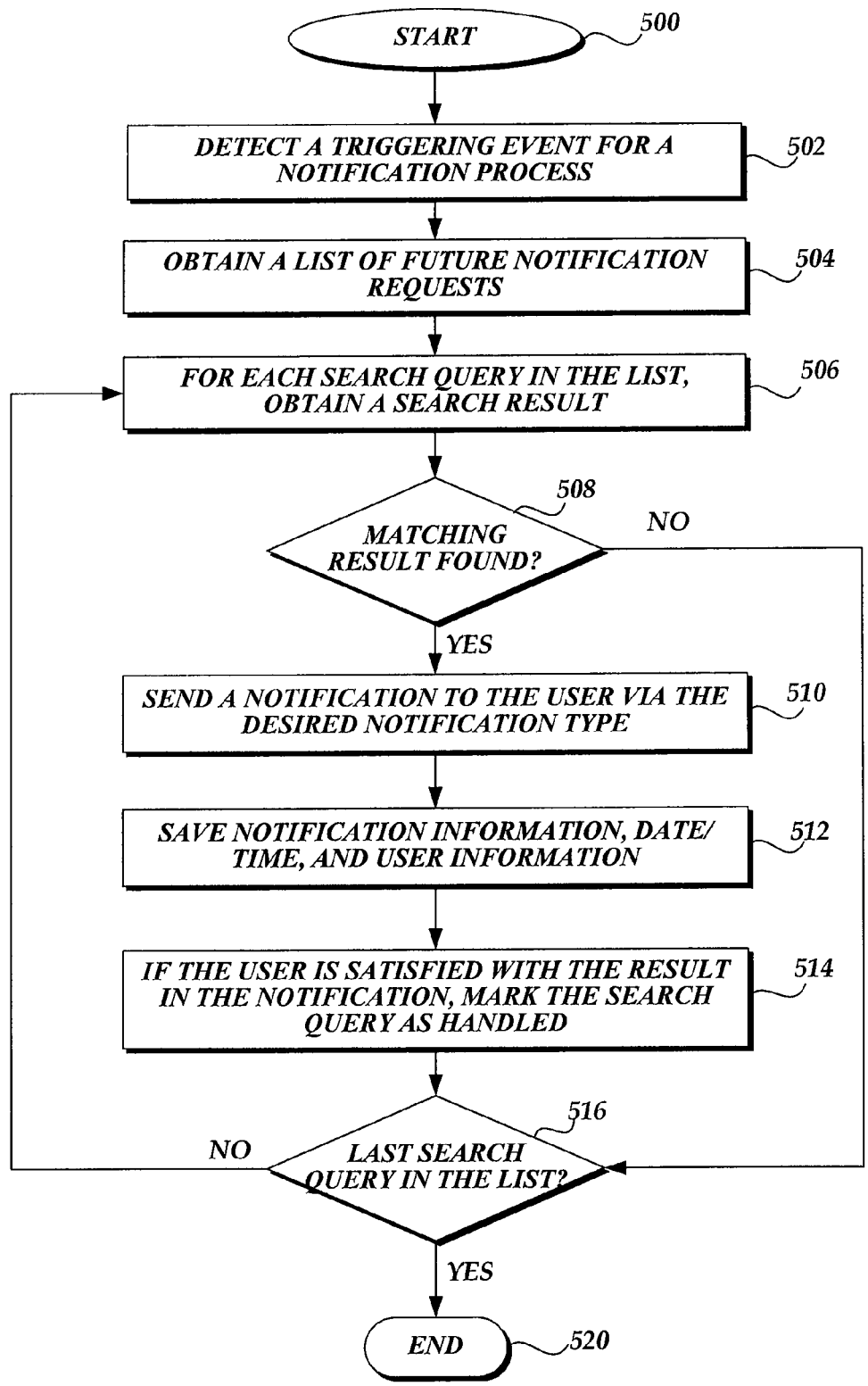
FIG. 5 is a flow diagram of a future notification subroutine in accordance with one embodiment.

FIG. 5 is a flow diagram of a future notification subroutine in accordance with one embodiment. In some embodiments, the system 110 may have defined a set of events that trigger a future notification process which determines whether some items become available for sale. The example of such events may be specified by a predetermined time, a set of conditions, etc. For example, if the catalog data store is updated because product information about a new item is provided from a merchant or a manufacture, the system 110 may check if any of a notification requests is related to the new item. For another example, the system 110 may work through the list of future notification requests once a week or once a month to check if any of the searched items become available. For the sake of discussion, it is assumed that the set of triggering events are predefined in the network purchasing system 110.

Beginning with block 502, the system 110 detects a triggering event for starting a notification process. Upon detection of the triggering event, the system 110 obtains a list of future notification requests at block 504. As discussed above, the list of future notification requests may include a series of requests, each of which has a search query, a desired notification type, a requesting user's identity, etc. The system 110 identifies a search query from each request. In some embodiments, the list of future notification requests may include several search queries, each search query associated with a user account. The system 110 may obtain desired notification type from user profile information based on the user account. At block 506, for each search query, the system 110 obtains search results. In one embodiment, the search engine component of the system 110 conducts a search based on the search query. As will be well appreciated, the search engine can conduct a search on the catalog detail data 112 in the data store 120 of the system 110, the third party data stores such as a merchant's data store, etc. At decision block 508, a determination is made as to whether any of the search results matches the search query with a threshold confidence.

If it is determined that the matching search result(s) is found, the system 110 may send a notification about the item availability to the user through the desired notification type at block 510. In one embodiment, the system may send a notification when information for items becomes available to be accessed. Referring now to FIG. 6B, assume that a user specified a desired notification type of "E-MAIL," and inputted "smith@xxx.com" for the email address. Based on the desired notification type, the system 110 may generate a notification email including a notification of availability, information about the item, and a detailed information page. Referring to FIG. 6E, an example of an email notification is depicted. As shown, an email message 670 is sent to the email address "smith@xxx.com" that the user has specified, at the time of the request. As mentioned above, the notification can be a voice message, a text message, a pop-up window, a chat message, etc. In addition, the notification can be sent to the user several times to make sure the user received the notification. As discussed above, several types of notifications may be generated and sent out to the user at the same time. If the matching search results do not provide information that the user wants, the user can select a menu option such as "Not the Item I Want" 674 to refine search criteria to obtain more information, as shown in FIG. 6E.

Referring back to FIG. 5, at block 512, the system 110 stores log information such as notification information (e.g., notification type, item information), date/time of the notification, and information about the user. At block 514, the search query is marked as handled in the list if the matching search results provide information that the user wants. In some embodiment, if the matching search results do not provide information that the user wants, the system may interact with the user to get more information to refine the search query. Once the search query is refined, the search engine may conduct another search on the catalog detail data 112 in the data store 120 of the system 110.

It is noted that some of the marked search queries may be removed from the list based on the user's response to the notification. In one embodiment, the user may respond to the notification such a way that the system can recognize if the user finds the information of the searched item. For example, if the user purchases an item through the notification, the notification may be removed from the list. If the user indicated that the information contained in the notification is not the information that the user want to access or is related to the searched item, the notification may be stored in the list. The system 110 may determine if all of the search queries in the list are handled at 516. If it is determined that all of the search queries are not handled, the routine returns back to block 506 and repeat the above mentioned steps. If it is determined that all of the search queries are handled, the routine complete at block 520.

In some embodiments, aggregated search information may be collected from a group of users and used for various marketing purposes. For example, if a certain number of users from one social network have searched information using similar search queries or a set of search keywords, the system may use such information for target marking, advertisement campaigning, etc. The aggregated search information may be shared with business partners, third party venders, manufacturers, advertising companies or the like.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®. In one embodiment a system utilizes Berkeley DB, which is a family of open source, embeddable databases that allows developers to incorporate within their applications a fast, scalable, transactional database engine with industrial grade reliability and availability.

The environment can include a variety of data stores and other memory and storage media as discussed above. These can reside in a variety of locations, such as on a storage medium local to (and/or resident in) one or more of the computers are remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the description as set forth in the claims.

What is claimed is:

1. A computer-implemented method for notifying a user when information for an item becomes available in an electronic marketplace, the method comprising:
   under control of one or more computer systems configured with executable instructions,
      receiving a search request from a user to locate an item;
      obtaining search results based on a search query corresponding to the search request;
      determining whether at least one of the search results at least meets a relevancy threshold with respect to the search query;
      if at least one of the search results at least meets the relevancy threshold, presenting the at least one of the search results to the user in response to the search request; and
      if none of the search results at least meet the relevancy threshold:
         providing the user with an ability to submit a notification request whereby the user will be notified when information for a matching item becomes available, the notification request including a desired notification type for an availability notification;
         in response to the notification request, storing at least the search query and the desired notification type for the notification request in a notification list;
         running the search query corresponding to the notification request at least once subsequent to the storing to obtain a new set of search results;
         if at least one of the new search results at least meets the relevancy threshold, generating an availability notification for the user according to the desired notification type, the user being able to access the at least one of the new search results to determine whether any of the at least one of the new search results is an item the user was searching for; and
         if none of the new search results at least meets the relevancy threshold, or the at least one of the new search results is not an item the user was searching for, storing at least the search query and the desired notification type for the notification request in the notification list, wherein the search query is capable of being re-run at a future time to attempt to locate at least one search result that at least meets the relevancy threshold with respect to the search query.

2. The computer-implemented method of claim 1, further comprising updating user profile information of the user to reflect user activities during the search service.

3. The computer-implemented method of claim 1, wherein presenting the at least one of the search results includes enabling the user to purchase an item by selecting a search result from the subset.

4. A computer-implemented method for notifying a user when the user is able to access information, comprising:
   under control of one or more computer systems configured with executable instructions,
      receiving a search query from a user;
      determining whether at least one search result of a set of search results matching the search query at least meets a relevancy threshold with respect to the search query; and
      if none of the set of search results at least meet the relevancy threshold:
         allowing the user to request a notification when the user is able to access information at least meeting the relevancy threshold, the request including a desired notification type for the notification;
         storing at least the search query and the desired notification type for the user;
         running the search query corresponding to the notification request at least once subsequent to the storing;
         if at anytime information becomes available, and is located as a result of running the search query, that at least meets the relevancy threshold, providing a notification to the user according to the desired notification type: and
if no new search results at least meet the relevancy threshold as a result of running the search query, or the available information is not what the user was searching for, storing at least the search query and the desired notification type for the notification request for the user, wherein the search query is capable of being re-run at a future time to attempt to locate information that becomes available and at least meets the relevancy threshold with respect to the search query.

5. The computer-implemented method of claim 4, wherein the relevancy threshold is predefined to filter a search result that is not related to the search query.

6. The computer-implemented method of claim 4, further comprising:
   detecting a triggering event; and
   in response to the triggering event, processing each notification request for the user to determine information that at least meets the relevancy threshold.

7. The computer-implemented method of claim 4, wherein the desired notification type is one of an email notification, a voice notification, a text notification, a chatting notification, or a pop-up window notification.

8. The computer-implemented method of claim 4, further comprising:
   if none of the search results at least meet the relevancy threshold:
      selecting second information based on aggregated search history information; and
      presenting the selected second information as an alternative option,
   wherein the aggregated search history information includes search history of a group of users.

9. The computer-implemented method of claim 4, further comprising:
   if none of the search results at least meet the relevancy threshold:
      obtaining another relevancy threshold;
      determining additional search results that at least meet the other relevancy threshold; and
      presenting the additional search results to the user in response to the search request.

10. The computer-implemented method of claim 4, further comprising:
    if none of the search results at least meet the relevancy threshold:
       obtaining information from a third party service provider based on the search request;
       presenting the obtained information to the user;
       receiving a response from the user about the obtained information, the response indicating whether the information obtained from the third party is relevant to the search request; and
       refining the search request based on the response.

11. A system for notifying a user when the user is able to access information, comprising:
    a processor; and
    a memory device including instructions that, when executed by the processor, cause the processor to:
       receive a search query from a user;
       determine whether at least one search result of a set of search results matching the search query at least meets a relevancy threshold with respect to the search query; and
       if none of the set of search results at least meet the relevancy threshold:
          allow the user to request a notification when the user is able to access information at least meeting the relevancy threshold, the request including a desired notification type for the notification;
          store at least the search query and the desired notification type for the user;
          run the search query corresponding to the notification request at least once subsequent to the storing;
       if at anytime information becomes available as a result of running the search query that at least meets the relevancy threshold, provide a notification to the user according to the desired notification type; and
       if no new search results at least meet the relevancy threshold as a result of running the search query, or the available information is not what the user was searching for, storing at least the search query and the desired notification type for the notification request for the user, wherein the search query is capable of being re-run at a future time to attempt to locate information that becomes available and at least meets the relevancy threshold with respect to the search query.

12. The system of claim 11, wherein the memory device further includes instructions that, when executed by the processor, cause the processor to:
    update user profile information to reflect interactions with the user.

13. The system of claim 11, wherein the memory device further includes instructions that, when executed by the processor, cause the processor to:
    detect a triggering event that starts a notification process.

14. The system of claim 11, wherein the memory device further includes instructions that, when executed by the processor, cause the processor to:
    during a process of notifying the user, obtain each notification request from a notification list and conduct another search based on a search request corresponding to the notification request.

15. The system of claim 14, wherein the memory device further includes instructions that, when executed by the processor, cause the processor to:
    if at least one search result that at least meets the relevancy threshold is obtained during the another search, transmit a notification in accordance with the desired notification type.

16. The system of claim 11, wherein the desired notification type is one of an email notification, a voice notification, a text notification, a chatting notification, or a pop-up window notification.

17. A computer program product embedded in a non-transitory computer-readable storage medium for notifying a user when the user is able to access information, comprising:
    program code for receiving a search query from a user;
    program code for determining whether at least one search result of a set of search results matching the search query at least meets a relevancy threshold with respect to the search query;
    program code for, if none of the search results at least meet the relevancy threshold, allowing the user to request a notification when information becomes available that at least meets the relevancy threshold,
    wherein the request includes a desired notification type for the notification,
    wherein at least the search query and the desired notification type for the notification request are stored in a notification list, wherein the search query is able to run at subsequent times until at least one search result is found that at least meets the relevancy threshold and that is indicated by the user to satisfy the search query, and wherein if no new search results at least meet the relevancy threshold as a result of running the search query for one of the subsequent times, or the available information is not what the user was searching for, storing at least the search query and the desired notification type for the notification request for the user, wherein the search query is capable of being re-run at a future time to attempt to locate information that becomes available and at least meets the relevancy threshold with respect to the search query.

18. The computer program product of claim 17, further comprising:

program code for updating user profile information to reflect user activities during the search.

19. The computer program product of claim 17, further comprising:

program code for detecting a triggering event that starts a notification process.

20. The computer program product of claim 17, further comprising:

program code for, during a process of notifying the user, obtaining each notification request from a notification list and conducting another search based on a search request corresponding to the notification request.

21. A system for notifying a user about available information for an item, comprising:

a processor; and a memory device including instructions that, when executed by the processor, cause the processor to:

detect a triggering event corresponding to one of a plurality of notification requests, each notification request including a search query for locating information for an item and a desired notification type for a user, each notification request being submitted in response to no search results matching the search query at least meeting a specified relevancy threshold;

re-run the search query in response to the triggering event to obtain a new set of search results;

determine whether any search results of the new set of search results at least meet a relevancy threshold with respect to the search request;

if at least one of the new set of search results at least meets the relevancy threshold with respect to the search query, generate a notification in accordance with the desired notification type and transmit the generated notification to the user; and if none of the new search results at least meet the relevancy threshold, or the information corresponding to at least one of the new search results at least meeting the relevancy threshold is not what the user was searching for, storing at least the search query and the desired notification type for the notification request for the user, wherein the search query is capable of being re-run at a future time to attempt to locate information that becomes available and at least meets the relevancy threshold with respect to the search query.

22. The system of claim 21, wherein the triggering event is detected at a predetermined time.

23. The system of claim 21, wherein the triggering event is detected when there is a change in information about items stored in a data store.

24. The system of claim 21, wherein the triggering event is detected when a third party provides advertisement campaign information.

25. The system of claim 21, wherein after transmitting the notification, information about the transmitted notification is stored.

26. The method of claim 1 wherein no notification to the user will be generated if no information becomes available that is located as a result of the system running the search query.

* * * * *